(12) United States Patent
Robles

(10) Patent No.: US 7,984,306 B1
(45) Date of Patent: Jul. 19, 2011

(54) SYSTEM AND METHOD FOR REDUCING PROCESSING LATENCY IN A SECURITY APPLIANCE

(75) Inventor: David Morgan Robles, Alameda, CA (US)

(73) Assignee: NetApp, Inc., Sunnyvale, CA (US)

( * ) Notice: Subject to any disclaimer, the term of this patent is extended or adjusted under 35 U.S.C. 154(b) by 849 days.

(21) Appl. No.: 11/605,159

(22) Filed: Nov. 28, 2006

(51) Int. Cl.
*G06F 11/30* (2006.01)

(52) U.S. Cl. ............ 713/189; 713/193; 726/30; 726/13; 380/269; 380/45

(58) Field of Classification Search .................. 713/186, 713/189
See application file for complete search history.

(56) References Cited

U.S. PATENT DOCUMENTS

| 5,890,203 | A  | * | 3/1999 | Aoki ............................. 711/111 |
| 6,792,544 | B2 | * | 9/2004 | Hashem et al. ................. 726/30 |
| 6,851,056 | B2 | * | 2/2005 | Evans et al. .................... 713/193 |
| 7,281,138 | B1 | * | 10/2007 | Di Benedetto ................ 713/189 |
| 7,415,723 | B2 | * | 8/2008 | Pandya ............................ 726/13 |
| 7,533,273 | B2 | * | 5/2009 | Patariu et al. .................. 713/189 |
| 2002/0166053 | A1 | * | 11/2002 | Wilson ............................ 713/189 |
| 2005/0166066 | A1 | * | 7/2005 | Ahuja et al. .................... 713/189 |
| 2007/0055891 | A1 | * | 3/2007 | Plotkin et al. .................. 713/189 |
| 2007/0058801 | A1 | * | 3/2007 | Plotkin et al. ................... 380/28 |
| 2007/0174634 | A1 | * | 7/2007 | Plotkin et al. .................. 713/189 |
| 2008/0040538 | A1 | * | 2/2008 | Matsuzawa et al. .......... 711/113 |
| 2008/0144826 | A1 | * | 6/2008 | Chang ........................... 380/269 |
| 2009/0268903 | A1 | * | 10/2009 | Bojinov et al. ................. 380/45 |

* cited by examiner

*Primary Examiner* — Kambiz Zand
*Assistant Examiner* — Yonas Bayou
(74) *Attorney, Agent, or Firm* — Cesari and McKenna, LLP

(57) ABSTRACT

A system and method enables efficient transfer and cryptographic processing of data within a security appliance. A network adapter of the security appliance initiates a random access data transfer to a system memory that is illustratively organized into a plurality of blocks of predetermined size. Mapping circuitry of the appliance is configured to track the progress of the data transfer between the adapter and memory such that, once data is stored in a memory block, an encryption processor of the appliance may process the data or the network adapter may retrieve the processed data without having to wait for completion of the data transfer between the adapter and memory, thereby reducing processing latency in the security appliance.

23 Claims, 5 Drawing Sheets

SYSTEM AND METHOD FOR REDUCING PROCESSING LATENCY IN A SECURITY APPLIANCE

FIELD OF THE INVENTION

The present invention relates to security appliances and, more specifically, to reducing processing latency in a security appliance.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, is such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients into encrypted data (ciphertext) destined for secure storage or "cryptainers" on the storage system. As such, the security appliance generally functions as a "store and forward" device that cryptographically processes, e.g., encrypts/decrypts, data contained in packets that normally flow directly between a client and a cryptainer on the storage system. As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

Typically, a network adapter of the security appliance receives the packets from the computer network and loads the data contained therein into a system memory coupled to a system bus of the appliance. The adapter may be configured to support random access (as opposed to stream-oriented) data transfers over the system bus which, in the context used herein, denotes that there is no guarantee of ordering of data transferred between the adapter and memory. For example, if the address range of the data packets received at the adapter extends from address zero to address 8 k bytes (8 kB), there are no guarantees that the data contained in the packets are loaded into system memory starting at address zero and proceeding contiguously to address 8 kB.

As a result, the security appliance must typically (i) wait for the entire data transfer to complete from the adapter into system memory (to ensure proper ordering of the data) prior to allowing an encryption unit of the appliance to perform cryptographic operations on the data (i.e., the "store") and then (ii) wait for those operations to complete before transferring the operation results over the network (i.e., the "forward"). The need to wait for completion of the entire data transfer before cryptographic operations can be performed introduces latency into the network environment which, in turn, results in an adverse impact on the data access performance of the storage system. That is, the faster the data is processed at the security appliance, the less impact such processing will have on data access performance.

Accordingly, it is desirable to provide an improved security appliance that reduces the latency introduced into a network environment as a result of the transfer of data and the cryptographic processing of that data within the appliance.

SUMMARY OF THE INVENTION

The present invention overcomes the disadvantages of the prior art by providing a system and method for enabling efficient transfer and cryptographic processing of data within a security appliance. A network adapter of the security appliance initiates a random access data transfer to a system memory that is illustratively organized into a plurality of blocks of predetermined size. Mapping circuitry of the appliance is configured to track the progress of the data transfer between the adapter and memory such that, once data is stored in a memory block, an encryption processor of the appliance may process the data or the network adapter may retrieve the processed data without having to wait for completion of the data transfer between the adapter and memory, thereby reducing processing latency in the security appliance.

In an illustrative embodiment, the mapping circuitry comprises a status map having a plurality of entries. Notably, each entry of the status map is associated with a block of system memory and is indexed at an address boundary equal to the memory block size. Once a portion of the data transfer crosses the address boundary, the mapping circuitry updates an entry of the status map to reflect a state for the associated block in system memory. Based on the state of a memory block, the encryption processor may process data stored within the block or the network adapter may retrieve the processed data from the block.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
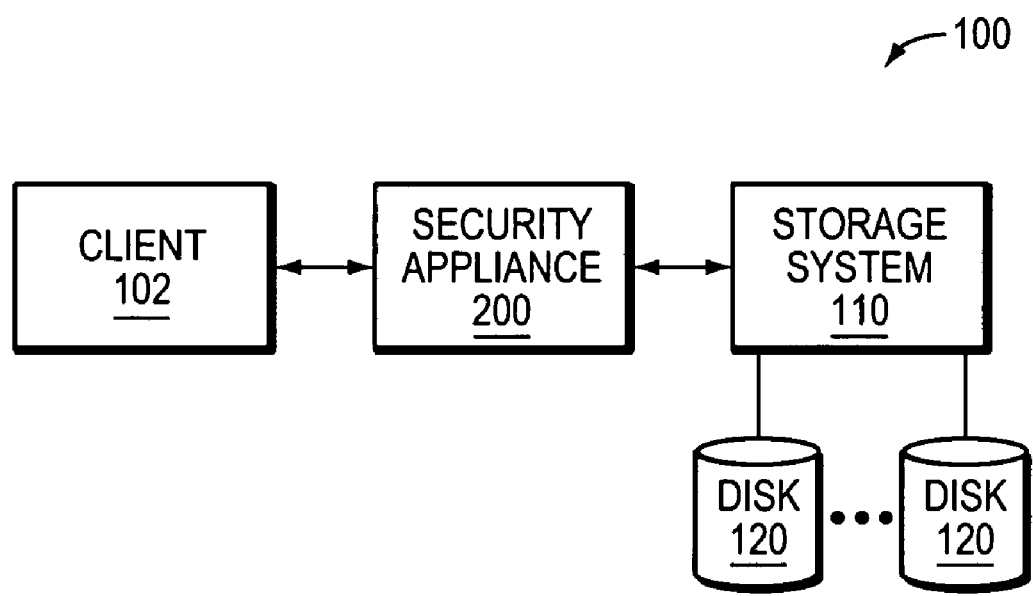
FIG. 1 is a schematic block diagram of an environment including a security appliance that may be advantageously used with the present invention.

FIG. 1 is a schematic block diagram of an environment 100 including a security appliance 200 that may be advantageously used with the present invention. The security appliance 200 is coupled between one or more clients 102 and one or more storage systems 110, such as an application server or filer. The security appliance 200 is configured to act as an encryption proxy and, as such, intercepts a data access request issued by client 102 and destined for the storage system 110. The data access request may be a read operation request to retrieve certain data stored on storage devices, such as disks 120, coupled to the storage system 110 or a write operation request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. The security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

Figure 2:
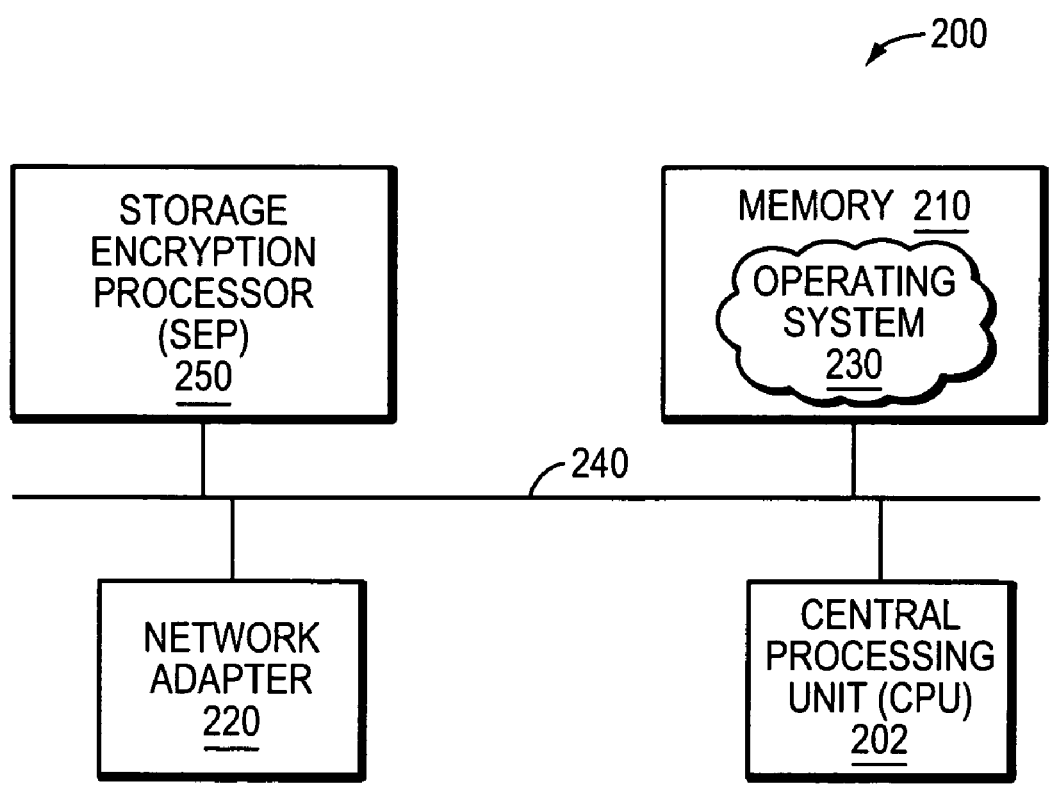
FIG. 2 is a schematic block diagram of the security appliance that may be advantageously used with the present invention.

FIG. 2 is a schematic block diagram of the security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing unit (CPU 202), a system memory 210, one or more network adapters 220, and one or more storage encryption processors (SEP 250) interconnected by a system bus 240, such as a conventional Peripheral Component Interconnect (PCI) bus. The PCI bus is a shared bus that facilities, inter alia, random, direct memory access (DMA) transfers of data between the network adapter 220 and system memory 210. The SEP 250 is configured to perform all cryptographic (e.g., encryption and decryption) processing operations for the security appliance in a secure manner; for example, the SEP is configured to protect plaintext encryption keys from system software executing on each CPU 202. Accordingly, the SEP is illustratively embodied as a FIPS 140-2 level-3 certified module that is epoxy-potted onto a dedicated interface card or other similar card.

The network adapter 220 couples the security appliance 200 between the client 102 and storage system 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapter 220 may comprise a host bus adapter (HBA) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapter 220 may comprise a network interface card (NIC) having the mechanical, electrical and signaling circuitry needed to connect the appliance to, e.g., an Ethernet network.

The system memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 230, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

The present invention is directed to a system and method for enabling efficient transfer and cryptographic processing of data within a security appliance. A network adapter of the security appliance initiates a random access data transfer to a system memory that is illustratively organized into a plurality of blocks of predetermined size. Mapping circuitry of the appliance is configured to track the progress of the data transfer between the adapter and memory such that, once data is stored in a memory block, an encryption processor of the appliance may process the data or the network adapter may retrieve the processed data without having to wait for completion of the data transfer between the adapter and memory, thereby reducing processing latency in the security appliance.

In an illustrative embodiment, the mapping circuitry comprises a status map having a plurality of entries. Notably, each entry of the status map is associated with a block of system memory and is indexed at an address boundary equal to the memory block size. Once a portion of the data transfer crosses the address boundary, the mapping circuitry updates an entry of the status map to reflect a state for the associated block in system memory. Based on the state of a memory block, the encryption processor may process is data stored within the block or the network adapter may retrieve the processed data from the block.

Figure 3:
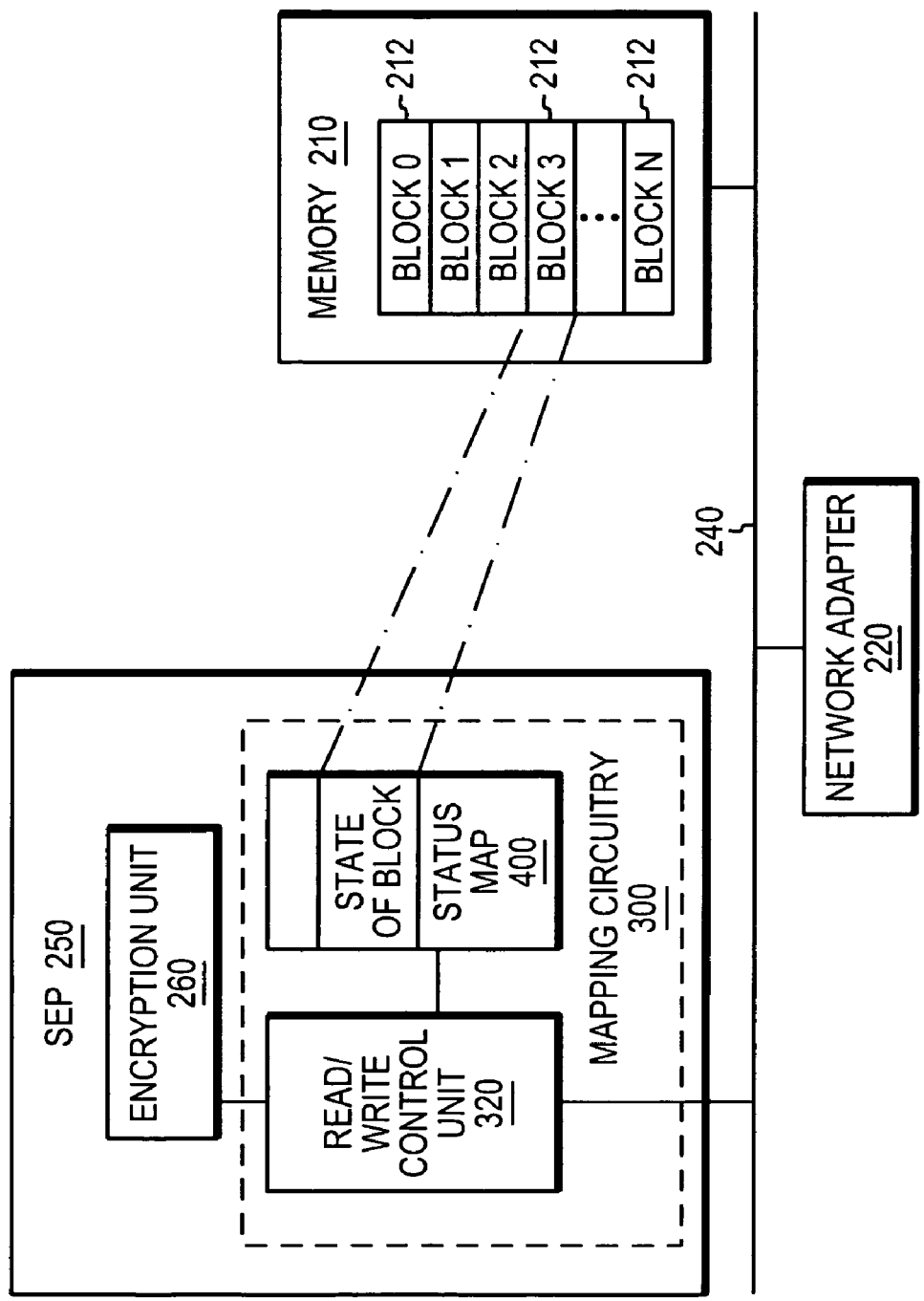
FIG. 3 is a schematic block diagram of mapping circuitry of the security appliance that may be advantageously used with the present invention.

FIG. 3 is a schematic block diagram of the mapping circuitry 300 that may be advantageously used with the present invention. The mapping circuitry 300 is illustratively contained within the SEP 250 and is coupled to an encryption unit 260 that is illustratively embodied as an encryption processor adapted to perform the cryptographic operations for the SEP. The mapping circuitry 300 is configured to track the progress of data transfers between the adapter 220 and system memory 210 by, inter alia, maintaining information directed to the organization of the memory. To that end, the system memory 210 is illustratively organized into N blocks 212 of substantially equal size, although it will be apparent to those skilled in the art that other memory organizations and block sizes can be used in accordance with the invention. By substantially equal it is illustratively meant that the majority of blocks are equal in size, however, one or more blocks may vary in size from the each other. It should be noted that in alternate embodiments, non-substantially equal block sizes may be utilized in accordance with the principles of the present invention.

Figure 4:
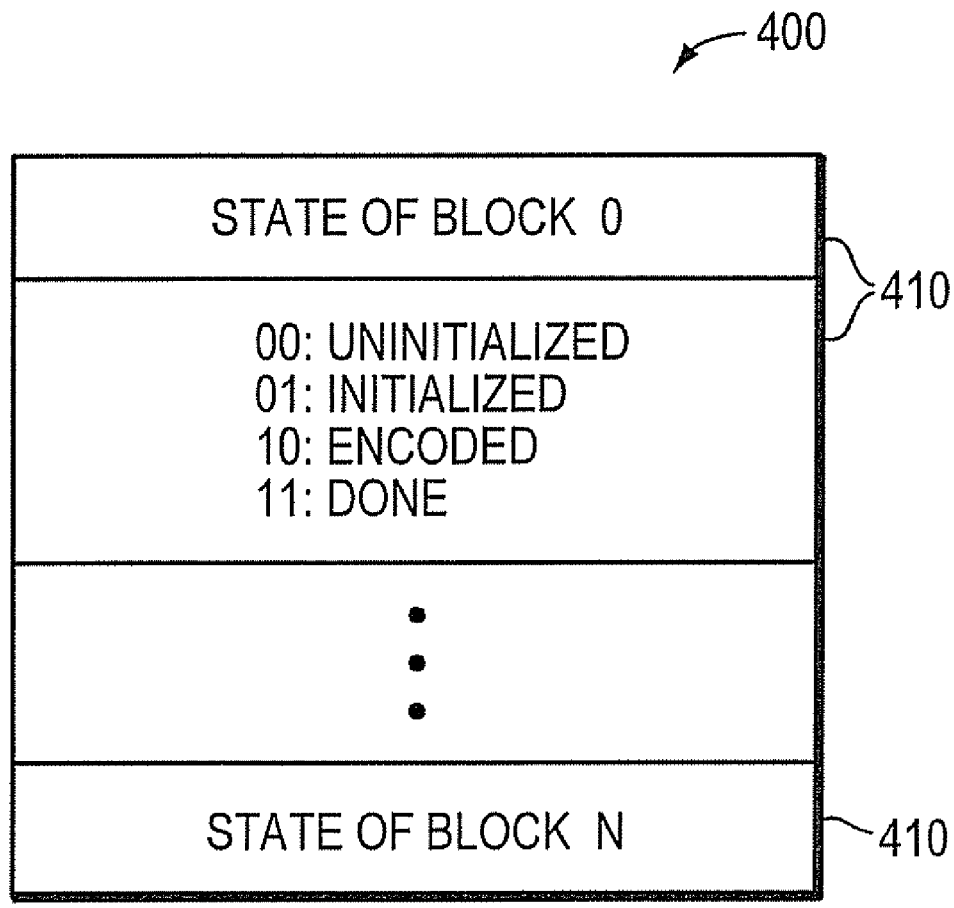
FIG. 4 is a schematic block diagram of a status map of the mapping circuitry that may be advantageously used with the present invention.

The mapping circuitry 300 illustratively includes read/write control unit 320 coupled to status map 400. The read/write control unit 320 comprises conventional circuitry, such as registers and combinational logic, adapted to monitor data transfer requests between the network adapter 220 and system memory 210 over the system bus 240. In response to such requests, the read/write control unit issues status update requests to the status map 400 and/or cryptographic processing requests to the encryption unit 260 of the SEP 250. The status map 400 is illustratively embodied as a small internal memory within the SEP 250 that is organized as a data structure, e.g., a table, having an index resolution that is selectable.

to FIG. 4 is a schematic block diagram of the status map 400 of the mapping circuitry 300 that may be advantageously used with the present invention. The status map 400 is illustratively organized as a plurality of entries 410, each of which is associated with a block 212 of system memory 210. Each entry 410 is illustratively indexed at an address boundary "range" equal to the memory block size, e.g., 1 k byte (1 kB). Furthermore, each entry 410 of the status map stores information encoded to track a current status (state) of its associated block 212. Illustratively, the status map encoding involves use of a 2-bit value denoting the state of a block. For example, a value of "0" (00) denotes that the state of the block is "uninitialized"; a value of "1" (01) denotes that data has been loaded into the block by the adapter and, thus, the state of the block is "initialized"; a value of "2" (10) denotes the data in the block has been processed (e.g., encrypted) by the SEP and, thus, the state of the block is "encoded"; and a value of "3" (11) denotes that the data in the block has been retrieved (read) by the adapter and, thus, the state of the block is "done". Those skilled in the art will understand that the address block boundary and status map encoding resolutions may vary, and that the range and value specified above are merely examples.

Based on the states of the blocks 212 in memory 210 (as reflected by the status map 400), the mapping circuitry 300 can track the status of data in any system memory address range and, therefore, when it is appropriate to access a block of data within that range for cryptographic processing by the SEP 250 or for retrieval by the network adapter 220. Notably, there is no limitation as to where the adapter 220 has to direct requests for data transfers into the memory 210 (or where the SEP 250 has to direct access requests for processing data stored in the memory). That is, the network adapter 220 may be configured to support random access write/read data transfers to/from the system memory 210. The mapping circuitry 300 need only track the address block boundary range of the data transfer (access) for each request and, once a portion of the data transfer crosses the block boundary, update the state of the status map 400 to reflect the current status for the appropriate block of memory.

Figure 5:
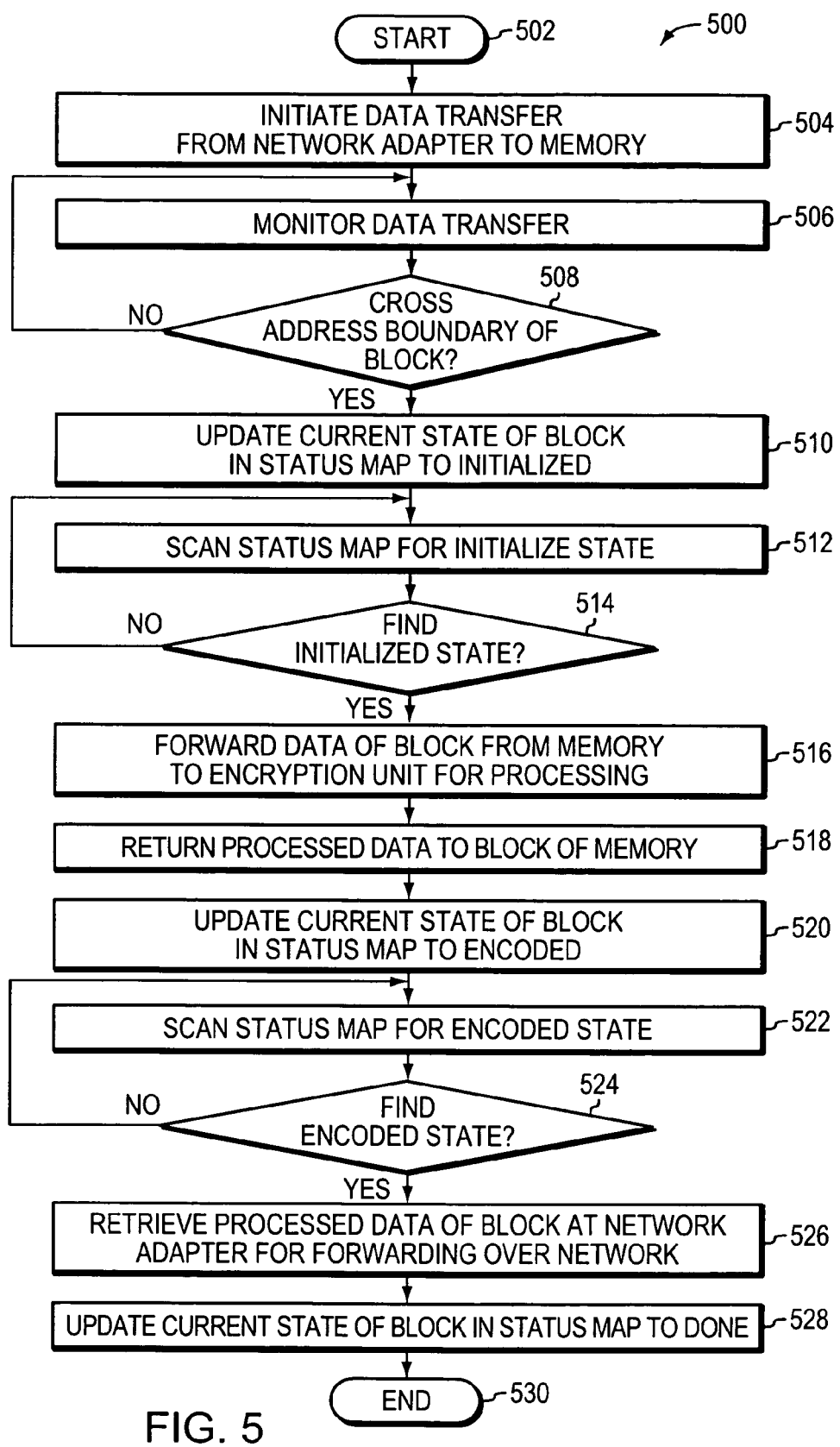
FIG. 5 is a flowchart illustrating a procedure for enabling efficient transfer and cryptographic processing of data within the security appliance in accordance with the present invention.

FIG. 5 is a flowchart illustrating a procedure 500 for enabling efficient transfer and cryptographic processing of data within a security appliance in accordance with the present invention. Assume the network adapter 220 transfers 8 kB of data into memory 210 by way of, e.g., a random access, DMA transfer of that data. Assume also that the memory is organized into blocks of selectable size of, e.g., 1 kB, and that the status map 400 is configured to track the progress of the data transfer at a selectable address boundary resolution of, e.g., 1 kB block of data. The procedure 500 starts at Step 502 and proceeds to is Step 504 where the adapter issues a random access, DMA write request over the bus 240 to the memory 210 to initiate the data transfer. In Step 506, the read/write control unit 320 of the mapping circuitry 300 monitors the data transfer over the bus 240 and, in Step 508, determines whether any portion of the data transfer crosses a 1 kB address boundary of a block. If not, the procedure returns to Step 506.

However, if a portion of the data transfer crosses the address boundary, the procedure continues to Step 510 where the control unit 320 indexes to an appropriate entry 410 of the status map 400 associated with the address range of the block (e.g., block 3) to update the current state of that block to initialized (e.g., from a value of "0" to a value of "1" denoting that the data has been loaded into the block by the adapter). That is, the control unit 320 monitors the data transfer and updates the appropriate entry 410 of the status map 400 in response to data being completely loaded into a block 212 of the memory 210.

Upon initialization of the memory block, the SEP 250 may access the data of the block to perform its cryptographic processing operation. Accordingly, in Step 512, the encryption unit 260 of the SEP 250 cooperates with the read/write control unit 320 to scan the status map entries 410 searching for initialized states, e.g., "1" values. If such a state is not found in Step 514, the procedure returns to Step 512. However, in response to finding an initialized state in Step 514, the control unit 320 retrieves the data from the appropriate address block range of memory 210 and forwards the data to the encryption unit 260 of the SEP 250 for processing (e.g., encryption) in Step 516. In Step 518, the SEP 250 returns (stores) the processed data to the appropriate address block range of memory 210 and, in Step 520, the read/write control unit 320 of the mapping circuitry 300 cooperates with the status map 400 to update the current state of the entry 410 associated with the block 212 to encoded (e.g., from a value of "1" to a value of "2" denoting that data has been processed/encrypted).

In Step 522, the network adapter 220 cooperates with the read/write control unit 320 to scan the states of the status map entries 410 searching for encoded states, e.g., "2" values. If such a state is not found in Step 524, the procedure returns to Step 522. However, in response to finding an encoded state in Step 524, the adapter 220 retrieves the processed data of the block (Step 526) for forwarding over the network to, e.g., the storage system 110. In Step 528, the adapter then cooperates with the control unit 320 of the mapping circuitry 300 to update the current state of the entry 410 associated with system memory block 212 to done (e.g., from a value of "2" to a value of "3" denoting that the processed data has been retrieved by the adapter). The procedure then ends at Step 530.

Advantageously, the inventive system and method enables efficient transfer and cryptographic processing of data within a security appliance even though a network adapter of the appliance cannot guarantee that it can perform an ordered DMA transfer of data, e.g., contiguously from address 0 to 8 kB, without retry or retransmission. For example, if the adapter 220 is forced to retransmit and reload data into a 1 kB block 212 of memory 210 because of a transmission error, the mapping circuitry 300 need only update the appropriate entry 410 of the status map 400 to reflect such retransmission (e.g., update to a value of "1" denoting that data has been loaded into the block by the adapter) so that the encryption unit 260 of the SEP 250 can (again) encrypt the data. Thus, the inventive mechanism enables processing of data by the SEP of the security appliance without having to wait for completion of an entire data transfer between a network adapter and system memory of the appliance, thereby reducing the latency associated with data processing in the security appliance and thereby increasing the efficiency thereof.

While there have been shown and described illustrative embodiments that enable efficient transfer and cryptographic processing of data within a security appliance, it is to be understood that various other adaptations and modifications may be made within the spirit and scope of the present invention. For example, as described herein, the network adapter 220 (e.g., an HBA or NIC) may be configured to perform a transfer of data within an address block range of the system memory 210. That is, the adapter may be programmed to perform (i) a write operation of data to a particular block 212 (e.g., a buffer) of the memory 210 within the address range and, after processing of the data by the SEP 250, (ii) a read operation of that processed data in the buffer. Accordingly, the network adapter 220 may be configured to "understand" the address block range organization of the system memory so that, if necessary, it can maintain its own order among the various blocks of processed data by, e.g., holding off retrieval of processed blocks from the memory 210 until it can present a contiguous address stream of data over the network.

The foregoing description has been directed to specific embodiments of this invention. It will be apparent, however, that other variations and modifications may be made to the described embodiments, with the attainment of some or all of their advantages. For instance, it is expressly contemplated that the components and/or circuitry described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system configured to enable transfer and cryptographic processing of data, comprising:
    a system memory comprising a plurality of blocks of predetermined size;
    a processor configured to process data stored within the plurality of blocks of the system memory;
    a network adapter configured to initiate a data transfer between the network adapter and the plurality of blocks of the system memory;
    a mapping circuitry configured to track progress of the data transfer between the network adapter and the plurality of blocks of the system memory, the mapping circuitry further configured to determine that a portion of the data transfer is completely stored in a block of the plurality of blocks of the system memory; and
    the processor further configured to process the portion of the data transfer completely stored in the block of the system memory in response to determining the portion of the data transfer is completely stored in the block, the portion of the data transfer configured to be processed before completion of the data transfer between the network adapter and the plurality of blocks of the system memory.

2. The system of claim 1 wherein the system memory is organized into blocks of equal size.

3. The system of claim 1 wherein the mapping circuitry comprises a status map comprising an entry associated with the block of the system memory and indexed at an address boundary equal to the predetermined size.

4. The system of claim 1 wherein the mapping circuitry further comprises a read/write control unit coupled to a status map, the read/write control unit configured to monitor the data transfer between the network adapter and the system memory over a system bus of an appliance.

5. The system of claim 3 further comprising a read/write control unit configured to update the entry of the status map to reflect a state for the block in the system memory in response to the portion of the data transfer crossing the address boundary.

6. The system of claim 3 wherein the entry of the status map stores information encoded to track the state for the block in the system memory.

7. The system of claim 5 wherein the processor is further configured to process data stored within the block based on the state of the block.

8. The system of claim 1 wherein the data transfer is a direct memory access transfer of data between the network adapter and the system memory.

9. A method for enabling transfer and cryptographic processing of data within a security appliance, comprising:
organizing a memory of the security appliance into a plurality of blocks of predetermined size;
initiating a data transfer between an adapter of the security appliance and the memory to store data of the data transfer in the memory;
determining that a portion of the data transfer is completely stored in a block of the plurality of blocks of the memory; and
processing the portion of the data transfer completely stored in the block of the memory before completion of the data transfer between the adapter and the plurality of blocks of the memory in response to determining the portion of the data transfer is completely stored in the block of the memory.

10. The method of claim 9 wherein organizing comprises organizing the plurality of blocks of the memory into equal size.

11. The method of claim 9 further comprising:
tracking progress of the data transfer between the adapter and the memory by maintaining organization information of the memory in a status map.

12. The method of claim 11 further comprising:
organizing the status map as a plurality of entries;
associating a first entry of the status map with the block of the memory; and
indexing the first entry at an address boundary equal to the predetermined size.

13. The method of claim 12 further comprising:
storing information in the first entry of the status map to track a state of the block associated with the first entry.

14. The method of claim 13 wherein storing comprises:
encoding the information stored in the first entry.

15. The method of claim 13 further comprising:
monitoring the data transfer between the adapter and the memory; and
updating the first entry of the status map to reflect the state of the block of the memory in response to the portion of the data transfer crossing the address boundary.

16. The method of claim 15 further comprising:
based on the state of the block of the memory, selecting one of (i) accessing the data of the block for processing by the processor, and (ii) retrieving the data by the adapter after processing.

17. An apparatus configured to enable transfer and cryptographic processing of data within a security appliance, comprising:
means for organizing a system memory of the security appliance into a plurality of blocks of predetermined size;
means for initiating a data transfer between an adapter of the security appliance and the memory to store data of the data transfer in the memory;
means for determining that a portion of the data transfer is completely stored in a block of the plurality of blocks of the memory; and
means for processing the portion of the data transfer completely stored in the block of the memory before completion of the data transfer between the adapter and the plurality of blocks of the memory in response to determining the portion of the data transfer is completely stored in the block of the memory.

18. A non-transitory computer readable storage medium containing executable program instructions executed by a processor, comprising:
program instructions that organize a memory of a security appliance into a plurality of blocks of predetermined size;
program instructions that initiate a data transfer between a network adapter of the security appliance and the memory to store data of the data transfer in the memory;
program instructions that determine that a portion of the data transfer is completely stored in a block of the plurality of blocks of the memory; and
program instructions that process the portion of the data transfer completely stored in the block of the memory before completion of the data transfer between the adapter and the plurality of blocks of in the system memory in response to determining the portion of the data transfer is completely stored in the block of the memory.

19. The non-transitory computer readable storage medium of claim 18 further comprising program instructions that track progress of the data transfer between the adapter and the memory by maintaining organization information of the memory in a status map.

20. The non-transitory computer readable storage medium of claim 19 further comprising:
program instructions that organize the status map as a plurality of entries;
program instructions that associate a first entry of the status map with the block of the memory; and
program instructions that index the first entry at an address boundary equal to the predetermined size.

21. The non-transitory computer readable storage medium of claim 20 further comprising program instructions that store information in the first entry of the status map to track a state of the block associated with the first entry.

22. The non-transitory computer readable storage medium of claim 21 further comprising:
program instructions that monitor the data transfer between the adapter and the memory; and
program instructions that update the first entry of the status map to reflect the state of the block of the memory in response to the portion of the data transfer crossing the address boundary.

23. The non-transitory computer readable storage medium of claim 22 further comprising:
program instructions that retrieve the data by the adapter after processing based on the state of the block of the memory.

* * * * *

UNITED STATES PATENT AND TRADEMARK OFFICE
CERTIFICATE OF CORRECTION

| | | |
|---|---|---|
| PATENT NO. | : 7,984,306 B1 | Page 1 of 1 |
| APPLICATION NO. | : 11/605159 | |
| DATED | : July 19, 2011 | |
| INVENTOR(S) | : David Morgan Robles | |

It is certified that error appears in the above-identified patent and that said Letters Patent is hereby corrected as shown below:

In Col. 1, line 24:
 blocks, configured to store information, ~~is~~ such as the actual In Col. 5, line 45:
 encryption processor may process ~~is~~ data stored within the In Col. 6, line 63:
 starts at Step 502 and proceeds to ~~is~~ Step 504 where the In Col. 10, line 32:
 adapter and the plurality of blocks ~~of~~ in the system Signed and Sealed this
Thirteenth Day of March, 2012

David J. Kappos
*Director of the United States Patent and Trademark Office*